(12) United States Patent
Imanishi et al.

(10) Patent No.: US 9,018,283 B2
(45) Date of Patent: Apr. 28, 2015

(54) RESIN COMPOSITION

(71) Applicants: Daicel Polymer Ltd., Tokyo (JP); Fuji Xerox Co., Ltd., Tokyo (JP)

(72) Inventors: Shinichiro Imanishi, Himeji (JP); Hideaki Sakamoto, Himeji (JP); Masayuki Okoshi, Minamiashigara (JP); Kenji Yao, Minamiashigara (JP)

(73) Assignees: Daicel Polymer Ltd., Tokyo (JP); Fuji Xerox Co., Ltd., Tokyo (JP)

( * ) Notice: Subject to any disclaimer, the term of this patent is extended or adjusted under 35 U.S.C. 154(b) by 41 days.

(21) Appl. No.: 13/630,466

(22) Filed: Sep. 28, 2012

(65) Prior Publication Data

US 2013/0085213 A1 Apr. 4, 2013

(30) Foreign Application Priority Data

Oct. 4, 2011 (JP) ................................. 2011-219784

(51) Int. Cl.
*C08L 55/02* (2006.01)
*C08L 33/20* (2006.01)
*C08L 1/14* (2006.01)
*C08K 5/521* (2006.01)
*C08K 3/22* (2006.01)
*C08K 5/1545* (2006.01)
*C08L 25/14* (2006.01)

(52) U.S. Cl.
CPC . *C08L 25/14* (2013.01); *C08L 1/14* (2013.01); *C08L 55/02* (2013.01)

(58) Field of Classification Search
CPC ........... C08K 2003/2241; C08K 5/523; C08K 5/1545; C08K 3/22; C08L 1/14; C08L 55/02; C08L 33/20
USPC ........................................ 524/37, 497, 40, 41
See application file for complete search history.

(56) References Cited

U.S. PATENT DOCUMENTS

| | | | | |
|---|---|---|---|---|
| 6,420,449 | B1 * | 7/2002 | Sagane et al. | 522/2 |
| 7,579,391 | B2 * | 8/2009 | Takahashi et al. | 523/216 |
| 7,863,382 | B2 | 1/2011 | Ishii et al. | |
| 2008/0262151 | A1 | 10/2008 | Ishii et al. | |
| 2011/0071247 | A1 | 3/2011 | Ishii et al. | |
| 2012/0101190 | A1 * | 4/2012 | Okoshi et al. | 523/437 |

FOREIGN PATENT DOCUMENTS

| | | |
|---|---|---|
| JP | 3695958 | 4/2000 |
| JP | 3704280 | 2/2002 |
| JP | 2006-111858 | 4/2006 |
| JP | 2007-161943 | 6/2007 |
| JP | 2008-303288 | 12/2008 |

OTHER PUBLICATIONS

SpecialChem—Antioxidant TNPP-PP—Material Datasheet—http://www.specialchem4polymers.com.*
SpecialChem—Elix 152 I—ABS—Material Datasheet—http://www.specialchem4polymers.com.*

* cited by examiner

*Primary Examiner* — Ling Choi
*Assistant Examiner* — Ronald Grinsted
(74) *Attorney, Agent, or Firm* — Flynn, Thiel, Boutell & Tanis, P.C.

(57) ABSTRACT

A resin composition containing: (A) a cellulose ester, (B) a styrene-based resin, and (C) a titanium dioxide, and not containing a compatibilizer between the component (A) and the component (B), in which the content of the component (A) is within a range of 95 to 50% by mass, the content of the component (B) is within a range of 5 to 50% by mass, and the content of the component (C) relative to 100 parts by mass of the sum of the amount of component (A) and the amount of component (B) is within a range of 0.1 to 10 parts by mass.

17 Claims, No Drawings

RESIN COMPOSITION

FIELD OF THE INVENTION

The present invention relates to a resin composition containing a cellulose ester and a styrene-based resin.

BACKGROUND ART

Up to now, a resin composition containing various types of resins has been used in a variety of parts, housings, and the like of household electric appliances and automobiles, housings of office equipment and electronic and electric equipment, and the like. In addition, as the resin used for the resin compositions, resins derived from plants have been adopted. Known resins from plants include cellulose ester, polylactic acid and the like, and there have been proposed resin compositions containing these resins.

JP-A 2007-161943 discloses an invention of a resin composition which includes a cellulose ester, a non-cellulose ester-based thermoplastic resin, a plasticizer for the cellulose ester, and a bleed-out suppressor for suppressing or preventing bleed-out of the plasticizer.

JP-A 2007-161943 describes that the resin composition can contain a deodorant, giving titanium oxide as an example of the inorganic deodorant (paragraphs 0166 to 0168), and also describes that the resin composition can contain a coloring agent, such as dyes or pigments, as an arbitrary component (paragraph 0228).

JP-A 2006-111858 discloses an invention of a resin composition which includes 75 to 10% by weight of one or more resins selected from (A) a poly lactic acid resin and (B) a cellulose ester, 25 to 90% by weight of (C) an aromatic polycarbonate resin, and (D) a compatibilizer in an amount of 1 to 50 parts by weight relative to 100 parts by weight of the sum of the amount of component (C) and the amount of one or more selected from component (A) and component (B).

In paragraph 0150 of JP-A 2006-111858, it is further described that blending of carbon black, titanium oxide, red iron oxide, ultramarine, fired yellow and, further, one or more of various colors of pigments and dyestuffs makes it possible to perform toning of the resin into various colors, and to improve weather (light) resistance and conductivity of the resin.

JP-A 2008-303288 discloses a fiber-reinforced flame-retardant resin composition which comprises (A) a thermoplastic polyester resin, (B) a fiber composed mainly of cellulose, and (C) a first flame retardant, in which the (C) first flame retardant contains a phosphate having a skeleton of 2,4,6-triamino-1,3,5-triazine, (melamine polyphosphate). JP-A 2008-303288 does not describe that there can be blended a pigment, an inorganic filler, and the like.

Japanese Patent publication No. 3704280 discloses a wood-based resin composition which contains a thermoplastic resin, a cellulose-based filler, an inorganic filler, and a foaming agent, in which the cellulose-based filler is subjected to modification processing by silicone in the presence of a fluorine-containing polymer.

Japanese Patent publication No. 3695958 discloses a woodgrain finish resin molded article having a specific weight within a range of 0.5 to 1.0, which is obtained by blending and molding: 100 parts by weight of a resin composition containing 1 to 60% by weight of a cellulose powder having 80% or higher brightness and 40 to 99% by weight of an acrylonitrile-butadiene-styrene copolymer resin (hereinafter referred to as the "ABS resin"), (2) 0.1 to 10 parts by weight of a resin composition including 3 to 20% by weight of a coloring agent and 80 to 97% by weight of a styrene-based resin having a ratio of the melt viscosity of 0.4 or less or 2.5 or more relative to that of the ABS resin, under a shear rate of $10^3$ sec$^{-1}$ at 200° C., and (3) 0.01 to 1 part by weight of a foaming agent.

(2) Japanese Patent publication No. 3695958 shows many examples of the coloring agent (paragraph 0020), and although titanium white is shown as one of them, the coloring agent applied in the Example is anthraquinone-based pigment.

SUMMARY OF THE INVENTION

The present invention is a cellulose ester-based resin composition, and the aim of the present invention is to provide a resin composition that suppresses discoloration caused by heat history applied at the time of molding, by the addition of a specified amount of titanium dioxide.

As a means to solve the problem, the present invention provides a resin composition including: (A) a cellulose ester, (B) a styrene-based resin, and (C) titanium dioxide, and not containing any compatibilizer between the component (A) and the component (B), the content of the component (A) being within a range of 95 to 50% by mass, the content of the component (B) being within a range of 5 to 50% by mass, and the content of the component (C) relative to 100 parts by mass of the sum of the amount of component (A) and the amount of component (B) being within a range of 0.1 to 10 parts by mass.

Owing to the masking effect caused by containing a specified amount of titanium dioxide that is the component (C), the resin composition of the present invention suppresses (makes inconspicuous) the coloring of a molded article obtained by heat history applied at the time of molding.

DETAILED DESCRIPTION OF THE INVENTION

<Component (A)>

The cellulose ester that is the component (A) can include the one selected from cellulose acetate, cellulose acetate propionate, cellulose acetate butyrate, cellulose acetate methylate, carboxymethyl cellulose acetate, cellulose acetate hydroxyethylate, hydroxyethyl cellulose acetate, cellulose acetate hydroxypropiolate, hydroxypropyl cellulose acetate, cellulose butyrate hydroxypropiolate, hydroxypropyl cellulose butyrate, cellulose diacetate, and the like. Among these, there are preferred cellulose acetate (CA), cellulose acetate propiolate (CAP), and cellulose acetate butyrate (CAB).

From the viewpoint of improving the flowability and increasing the mechanical strength of the molded article, the cellulose ester that is the component (A) may contain a plasticizer in an amount from 5 to 25 parts by mass relative to 100 parts by mass of the cellulose ester.

The plasticizer is preferably an adipate-based one excluding phthalic acid ester, and a polyester-based one.

The weight average molecular weight of the cellulose ester is preferably within a range of 10,000 to 100,000 from the viewpoint of maintaining flowability (processability), and more preferably within a range of 15,000 to 80,000.

The weight average molecular weight can be determined through the use of a gel permeation chromatographic Apparatus (Model Prominence GPC, manufactured by Shimadzu Corporation) and a Shim-pack GPC-80M as a column for measurement.

<Component (B)>

The styrene-based resin that is the component (B) contains a styrene unit as the structural unit, and examples of the styrene-based resin are PS resin (polystyrene homopolymer) and copolymers.

Examples of the copolymers can include ones selected from ABS (acrylonitrile-butadiene-styrene) resin, AS (acrylonitrile-styrene) resin, ASA (acrylonitrile-styrene-acrylic rubber) resin, AES (acrylonitrile-ethylenepropylene rubber-styrene) resin, ACS (acrylonitrile-chlorinated polyethylene-styrene) resin, HIPS (high impact-resistant polystyrene) resin, MS (methylmethacrylate-styrene) resin, MBS (methylmethacrylate-butadiene-styrene) resin, MABS (methylmethacrylate-acrylonitrile-butadiene-styrene) resin, SB (styrene-butadiene) resin, SBS (styrene-butadiene-styrene) resin, SEBS resin (styrene-ethylene/butylene-styrene), SIS (styrene-isoprene-styrene) resin, SIBS (styrene-isoprene/butadiene-styrene) resin, SEPS (styrene-ethylene/propylene-styrene) resin and the like, and a combination thereof is possible.

The styrene-based resin that is the component (B) is preferably an ABS resin, AS resin, or a combination thereof.

From the viewpoint of shock resistance, the ABS resin, when used, is preferably the one having 5 to 60% by mass of rubber content, and 10 to 60% of mass thereof is more preferable.

From the viewpoint of moldability, the AS resin, when used, is preferably the one having 10 to 200 g/10 min of melt flow rate, and 15 to 200 g/10 min is more preferable.

Combined use of the ABS resin and the AS resin makes it possible to adjust the rubber content and the melt flow rate to the above-described range, respectively.

As to the content of component (A) and component (B), respectively, in the resin composition, relative to the sum of the amount of component (A) and the amount of component (B), the component (A) is within a range of 50 to 95% by mass, preferably 70 to 95% by mass, and more preferably 80 to 95% by mass, and the component (B) is within a range of 50 to 5% by mass, preferably from 30 to 5% by mass, and more preferably from 20 to 5% by mass.

When the content of component (A) is less than 50% by mass and when the content of component (B) exceeds 50% by mass, the issue of the present invention cannot be solved.

<Component (C)>

Titanium dioxide that is the component (C) is a component for imparting the effect of suppressing discoloration (masking effect) of a molded article caused by heat history applied at the time of molding when obtaining a molded article by molding the resin composition of the present invention containing a specified content ratio of component (A) to component (B) that is the resin components.

Titanium dioxide has crystalline forms such as rutile type and anatase type, and any crystal types may be used.

In order to exert the above-described masking effect, the average particle size of titanium dioxide is preferably within a range of 0.01 to 3 μm, and more preferably from 0.01 to 1 μm. The average particle size can be determined by an electron microscope.

Titanium dioxide may be, as necessary, subjected to surface treatment through the use of aluminum oxide, silicon oxide, zinc oxide, zirconium oxide, polyol, silane coupling agent, and the like.

The content of titanium dioxide that is the component (C) in the resin composition is 0.1 to 10 parts by mass relative to 100 parts by mass of the sum of the amount of component (A) and the amount of component (B), preferably 0.3 to 5 parts by mass, and more preferably 0.5 to 3 parts by mass.

The resin composition of the present invention can further contain a lubricant as the (D) component.

The lubricant that is the (D) component can include a higher fatty acid and a derivative thereof such as an ester and an amide thereof, olefin wax, and liquid paraffin, and for example, there can be applied the ones described in paragraphs 0017 to 0022 of JP-A 2000-212451 (excluding salts of the higher fatty acids described in paragraph [0019] and paragraph [0020] thereof).

The content of the lubricant that is the (D) component in the resin composition is 0.01 to 3 parts by mass relative to 100 parts by mass of the sum of the amount of component (A) and the amount of component (B), and preferably 0.1 to 2 parts by mass.

The resin composition of the present invention can further contain a phosphate ester that is the (E) component as the flame retardant.

As the phosphate ester that is the (E) component, there can be used the one well-known as a flame retardant, such as PX-200, 202, CR-741, CR-733S, or TPP (triphenylphosphate), manufactured by Daihachi Chemical Industry Co., Ltd.

The content of phosphate that is the (E) component in the resin composition is 5 to 40 parts by mass relative to 100 parts by mass of the sum of the amount of component (A) and the amount of component (B), preferably 10 to 40 parts by mass, and more preferably 10 to 30 parts by mass.

The resin composition of the present invention can further contain an antioxidant that is the (F) component.

The antioxidant that is the (F) component include phosphate-based antioxidants, sulfur-based antioxidants, phenol-based antioxidants (for example, phosphite-based antioxidants, thioether-based antioxidants and the like, which are described in paragraphs 0015 to 0025 of JP-A 7-76640 and then allyl phosphite and alkyl phosphite such as tris(2,4-di-t-butylphenyl)phosphite or tris-isodecylphosphite), and amine-based antioxidant, which are known as antioxidants for resins. Among these, phosphorus-based antioxidant and sulfur-based antioxidant are preferred.

The content of the antioxidant that is the (F) component in the resin composition is 0.01 to 3 parts by mass relative to 100 parts by mass of the sum of the amount of component (A) and the amount of component (B), and preferably 0.01 to 1 part by mass.

In accordance with the intended use, the resin composition of the present invention can contain commonly-used additives, inorganic fillers, stabilizers (UV absorber, thermal stabilizer, light resistant stabilizer, and the like), coloring agents, such as dyes or pigments excluding titanium dioxide, flame retardants, antistatic agents, mold release agents, anti-blocking agents, dispersers, fluidizers, anti-dripping agents, anti-microbials, and the like.

The resin composition of the present invention contains the above-described components (A), (B) and (C), and other components to be added as necessary. However, the resin composition of the present invention does not contain any compatibilizer between the component (A) and the component (B).

The resin composition of the present invention can be manufactured through the use of a twin-screw extruder, a Henschel mixer, a Banbury mixer, a single screw extruder, a multiscrew extruder, a kneader, and the like.

EXAMPLES

Examples and Comparative Examples

The respective compositions of Examples and Comparative Examples were obtained by mixing the components listed in Table 1. The thus-obtained compositions were each evaluated in terms of the evaluation items shown in Table 1.

Detail of the components shown in Table 1 will be as follows:

Component (A) Cellulose acetate propionate: CAP-482-20 (manufactured by Eastman Chemical Company) (degree of substitution (propionyl) 2.6, degree of substitution (acetyl) 0.1)

Component (B)
Styrene-based resin 1: ABS resin, ST/AN ratio=74/26, amount of rubber=15, MFR=19 g/10 min
Styrene-based resin 2: ABS resin, ST/AN ratio=74/26, amount of rubber=16, MFR=45 g/10 min
Styrene-based resin 3: ABS resin, ST/AN ratio=73/27, amount of rubber=40, MFR=1 g/10 min
Styrene-based resin 4: AS resin, ST/AN ratio=76/24, MFR=32 g/10 min
where, ST indicates styrene and AN indicates acrylonitrile, and the test condition of MFR is 220° C. 10 kg.

Component (C)
Titanium dioxide: R-FC5 90E (manufactured by Sankyo Chemical Co., Ltd.)

Component (D)
Lubricant 1: ALFLOW-H-50S (manufactured by NOF Corporation, ethylene-bis-stearyic acid amide)
Lubricant 2: Hycol K-350 (manufactured by Kaneda Co., Ltd., liquid paraffin)

Component (E)
Phosphate ester: PX-200 (manufactured by Daihachi Chemical Industry Co., Ltd., aromatic condensed phosphate ester)

Component (F)
Antioxidant 1: Adekastab PEP-8 (manufactured by ADEKA Corporation, cyclic neopentane tetraylbis(octadecylphosphite))
Antioxidant 2: IRGAFOS 168 (BASF Japan Ltd., tris(2,4-di-t-butylphenyl)phosphite)

(Flame Retardancy)
Vertical combustion test based on UL-94 Standard was performed with respect to a molded article having a thickness of 1.5 mm, and evaluation was made.

(Tensile Strength and Tensile Elongation)
In accordance with ISO527, tensile test was given at a speed of 50 mm/min for determination of the tensile strength and the tensile elongation (nominal tensile strain at break).

(Charpy Impact Strength)
Determination was performed in accordance with ISO179/1 eA.

(Deflection Temperature Under Load)
Determination was performed in accordance with ISO75 at a bending stress of 1.80 MPa.

(Melt Flow Rate)
Determination was performed in accordance with ISO1133.

(Discoloration Caused by Retention at the Time of Molding)
Through the use of a 265/100MS2 molding machine manufacture by Mitsubishi Heavy Industries, Ltd., a test piece 1 having a size of 90 mm×50 mm×3 mm was fabricated at a cylinder temperature of 220° C.

Furthermore, within the cylinder of the same molding machine, a test piece 2 was fabricated by similar procedure to that of test piece 1 except that the material was held at 220° C. for 10 min of retention time.

From the color difference (ΔE) between the test piece 1 and the test piece 2, the color difference (ΔE) caused by presence/absence of retention and holding (held at 220° C. for 10 min of retention time) was determined by the following criterion. Smaller color difference (ΔE) indicates smaller discoloration caused by retention at the time of molding (discoloration caused by heat).

(Determination of Hue Change)
X: ΔE 8 or more
Δ: ΔE 3 or more to less than 8
○: ΔE less than 3

TABLE 1

|   |   | Examples | | | | | | Comparative Examples | |
|---|---|---|---|---|---|---|---|---|---|
|   |   | 1 | 2 | 3 | 4 | 5 | 6 | 1 | 2 |
| (A) | CAP | 90 | 90 | 90 | 90 | 90 | 90 | 90 | 90 |
| (B) | ABS1 | 10 |   |   | 10 | 10 | 10 | 10 | 10 |
|   | ABS2 |   | 10 |   |   |   |   |   |   |
|   | ABS3 |   |   | 3 |   |   |   |   |   |
|   | AS |   |   | 7 |   |   |   |   |   |
|   | Total (% by mass) |   |   |   | 100 |   |   | 100 |   |
| (C) | Titanium dioxide | 1.3 | 1.3 | 1.3 | 1.3 | 1.3 | 1.3 |   |   |
| (D) | Lubricant 1 | 0.5 | 0.5 | 0.5 | 0.5 | 0.5 |   |   | 0.5 |
|   | Lubricant 2 |   |   |   |   |   | 0.5 |   |   |
| (E) | PX-200 | 25 | 25 | 25 | 25 | 25 | 25 | 25 | 25 |
| (F) | Antioxidant 1 | 0.1 | 0.1 | 0.1 |   | 0.1 | 0.1 |   | 0.1 |
|   | Antioxidant 2 |   |   |   | 0.1 |   |   |   |   |
| Evaluation items | Flame retardancy | V-2 | V-2 | V-2 | V-2 | V-2 | V-2 | V-2 | V-2 |
|   | Tensile strength | 49 | 50 | 51 | 49 | 48 | 49 | 49 | 48 |
|   | Tensile elongation (%) | 24 | 30 | 30 | 23 | 29 | 24 | 48 | 46 |
|   | Charpy impact strength (kJ/m$^2$) | 9.7 | 9.8 | 9.7 | 10.2 | 11.2 | 7.2 | 11.0 | 11.7 |
|   | Deflection temperature under load (° C.) | 53 | 55 | 57 | 53 | 53 | 54 | 53 | 53 |
|   | Melt flow rate (g/10 min) (200° C., 5 kg) | 14.4 | 15.4 | 13.9 | 14.4 | 14.6 | 13.5 | 12.4 | 12.8 |
|   | Discoloration cased by retention at the time of molding (ΔE) | ○ | ○ | ○ | ○ | ○ | ○ | X | X |

What is claimed is:

1. A resin composition, comprising: (A) a cellulose ester, (B) a styrene-based resin, (C) titanium dioxide, (D) a lubricant in an amount of 0.01-3 parts by mass, (E) a phosphate ester in an amount of 5-40 parts by mass and (F) an antioxidant in an amount of 0.01-3 parts by mass, and not containing a compatibilizer between the component (A) and the component (B), the content of component (A) being within a range of 95 to 50% by mass, the content of component (B) being within a range of 5 to 50% by mass, relative to the sum of the amount of component (A) and the amount of component (B), the content of component (C) relative to 100 parts by mass of the sum of the amount of component (A) and the amount of component (B) being within a range of 0.1 to 10 parts by mass, and the content of components (D), (E), and (F) are each relative to 100 parts by mass of the sum of the amount of component (A) and the amount of component (B).

2. The resin composition according to claim 1, wherein the cellulose ester of the component (A) is selected from the group consisting of a cellulose acetate, a cellulose acetate propionate, and a cellulose acetate butyrate.

3. The resin composition according to claim 1, wherein the styrene-based resin of the component (B) is selected from the group consisting of an ABS resin and an AS resin.

4. The resin composition according to claim 1, wherein the cellulose ester of component (A) is selected from the group consisting of cellulose acetate, cellulose acetate propionate, cellulose acetate butyrate, cellulose acetate methylate, cellulose acetate hydroxyethylate, cellulose acetate hydroxypropiolate, cellulose butyrate hydroxypropiolate and cellulose diacetate.

5. The resin composition according to claim 1, wherein the cellulose ester of component (A) has a weight average molecular weight within a range of 10,000 to 100,000.

6. The resin composition according to claim 1, wherein the cellulose ester of component (A) has a weight average molecular weight within a range of 15,000 to 80,000.

7. The resin composition according to claim 1, wherein the styrene-based resin of the component (B) is selected from the group consisting of ABS (acrylonitrile-butadiene-styrene) resin, acrylonitrile-styrene resin, acrylonitrile-styrene-acrylic rubber resin, acrylonitrile-ethylenepropylene rubber-styrene resin, acrylonitrile-chlorinated polyethylene-styrene resin, high impact-resistant polystyrene resin, methylmethacrylate-styrene resin, methylmethacrylate-butadiene-styrene resin, methylmethacrylate-acrylonitrile-butadiene-styrene resin, styrene-butadiene resin, styrene-butadiene-styrene resin, styrene-ethylene/butylene-styrene resin, styrene-isoprene-styrene resin, styrene-isoprene/butadiene-styrene resin and styrene-ethylene/propylene-styrene resin.

8. The resin composition according to claim 1, wherein the styrene-based resin of the component (B) is selected from the group consisting of an acrylonitrile-butadiene-styrene resin having 5 to 60% by mass of rubber content and an acrylonitrile-styrene resin having 10 to 200 g/10 min of melt flow rate.

9. The resin composition according to claim 1, wherein titanium dioxide (C) is a component for imparting the effect of suppressing discoloration of a molded article, caused by heat history.

10. A molded article obtained by molding the resin composition according to claim 1, being suppressed from discoloration caused by heat history.

11. The resin composition according to claim 1, wherein titanium dioxide (C) has a crystalline form of rutile type or anatase type.

12. The resin composition according to claim 1, wherein titanium dioxide (C) has an average particle size within a range of 0.01 to 3 μm, determined by an electron microscope.

13. The resin composition according to claim 1, wherein titanium dioxide (C) has been treated by a surface treatment with aluminum oxide, silicon oxide, zinc oxide, zirconium oxide, polyol or silane coupling agent.

14. The resin composition according to claim 1, wherein the amount of component (A) is within the range of 80 to 95% by mass, the amount of component (B) is within the range of 20 to 5% by mass and the content of titanium dioxide (C) is 0.5 to 3 parts by mass.

15. The resin composition according to claim 1, further comprising (D) a lubricant selected from the group consisting of a higher fatty acid, an ester of a higher fatty acid and an amide of a higher fatty acid, an olefin wax and liquid paraffin; (E) a phosphate ester flame retardant and (F) an antioxidant selected from the group consisting of phosphate-based antioxidants, sulfur-based antioxidants, phenol-based antioxidants, phosphite-based antioxidants and thioether-based antioxidants.

16. A molded article, obtained by molding a resin composition according to claim 1, comprising: (A) a cellulose ester, (B) a styrene-based resin and (C) titanium dioxide, and not containing a compatibilizer between component (A) and component (B), the content of component (A) being within a range of 95 to 50% by mass, the content of component (B) being within a range of 5 to 50% by mass, relative to the sum of the amount of component (A) and the amount of component (B), and the content of component (C) relative to 100 parts by mass of the sum of the amount of component (A) and the amount of component (B) being within a range of 0.1 to 10 parts by mass.

17. The resin composition according to claim 1, consisting essentially of components (A), (B) and (C).

* * * * *